(No Model.) 2 Sheets—Sheet 1.
J. W. KENT & R. ORR.
ANTI-FREEZING DEVICE FOR WATER PIPES.
No. 395,748. Patented Jan. 8, 1889.
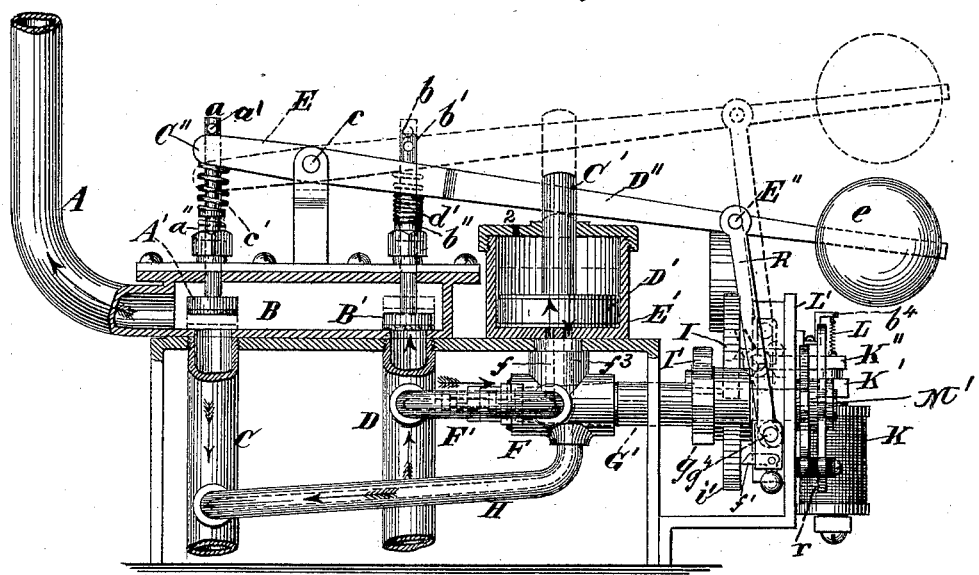
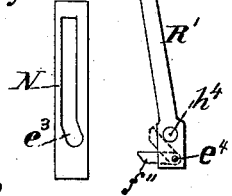
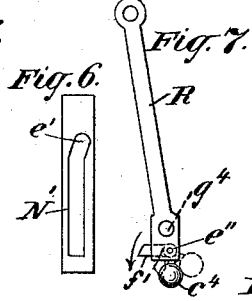
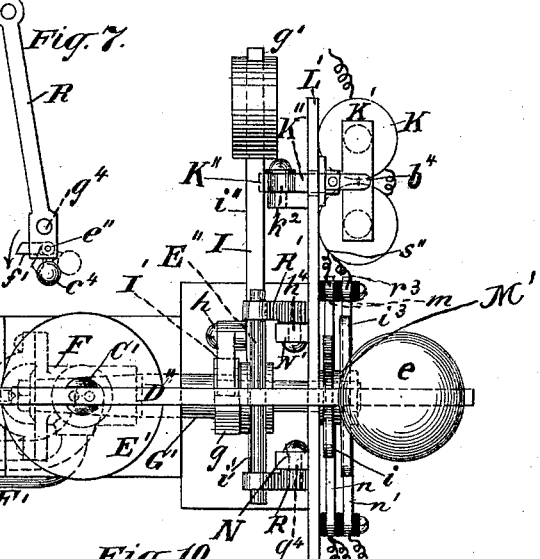
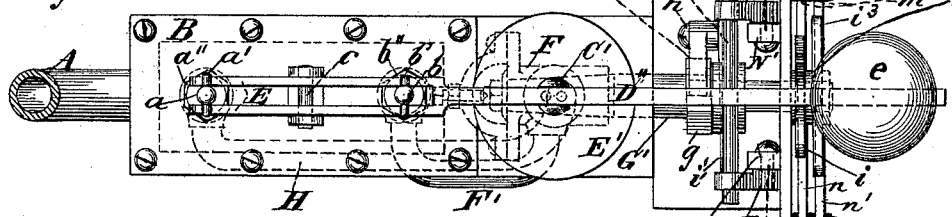
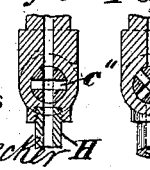
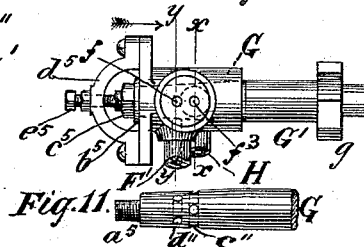
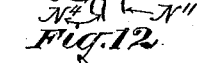
WITNESSES
John Becker
Charles A. Herbert
INVENTORS
James W. Kent
Robert Orr
N. PETERS, Photo-Lithographer, Washington, D.C.

(No Model.) 2 Sheets—Sheet 2.
J. W. KENT & R. ORR.
ANTI-FREEZING DEVICE FOR WATER PIPES.
No. 395,748. Patented Jan. 8, 1889.
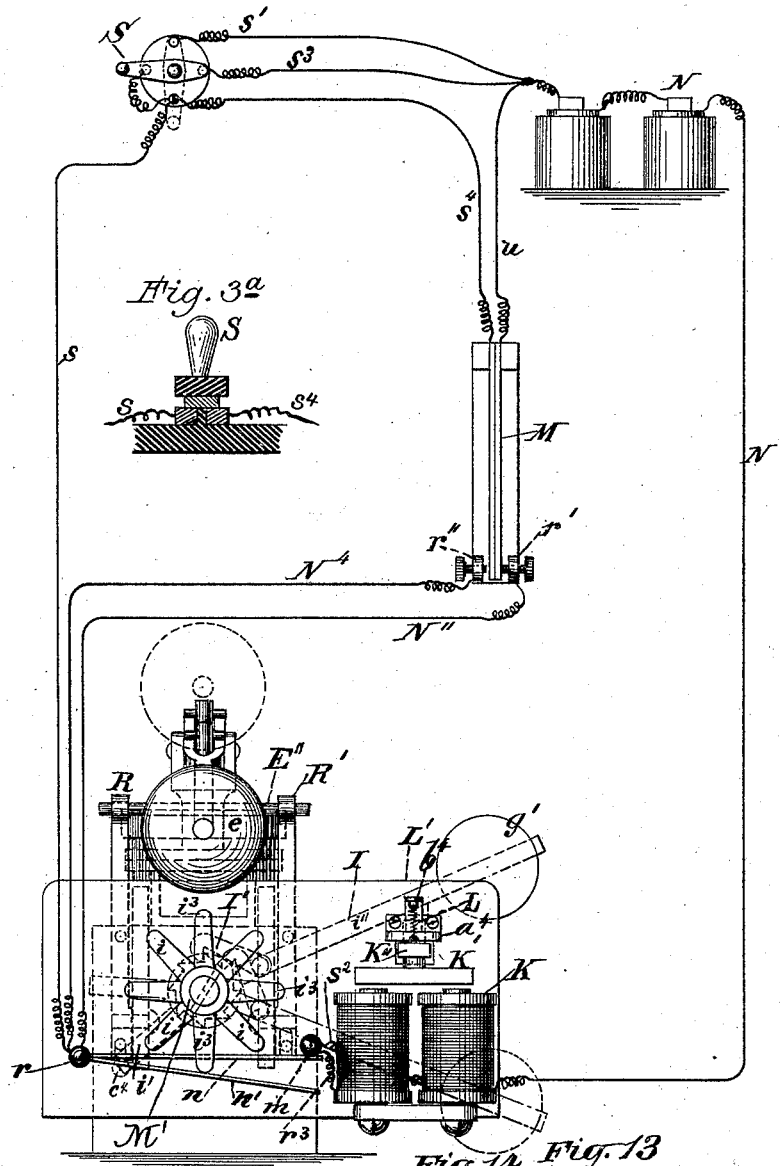
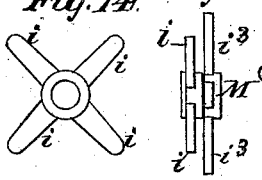
WITNESSES
John Becker
Charles A. Herbert
INVENTORS
James W. Kent
Robert Orr

UNITED STATES PATENT OFFICE.

JAMES W. KENT AND ROBERT ORR, OF BROOKLYN, NEW YORK.

ANTI-FREEZING DEVICE FOR WATER-PIPES.

SPECIFICATION forming part of Letters Patent No. 395,748, dated January 8, 1889.

Application filed September 8, 1887. Serial No. 249,099. (No model.)

*To all whom it may concern:*

Be it known that we, JAMES W. KENT and ROBERT ORR, both of Brooklyn, in the county of Kings and State of New York, have invented certain new and useful Improvements in Apparatus for Voiding Water-Pipes; and we do hereby declare that the following is a full, clear, and exact description of the invention, which will enable others skilled in the art to which it appertains to make and use the same.

This invention relates to that class of apparatuses which are designed for automatically emptying the water-pipes of dwellings and other buildings when the atmospheric temperature approaches the freezing-point, the object being to prevent the freezing of the water in the pipes and the consequent bursting of or injury to the latter.

Our invention comprises certain novel combinations of parts, whereby we provide an apparatus of the class indicated by comparatively simple construction, capable of ready application to the water-pipes, and having very great certainty of operation.

Figure 1 is a side elevation, Fig. 2 a plan view, Fig. 3 an end view, of an apparatus constructed according to our said invention; and Fig. 3ª, a sectional detail view of the divided button of the switch. Figs. 4 to 15, inclusive, are detail views more fully illustrating certain of the parts of said apparatus.

A is the water-pipe, through which water is conducted from the street-main to the system of water-supplying pipes within the building or other structure. The lower end of this pipe terminates in a chamber, B, from which extend two pipes, C and D, the former being the waste-pipe and the latter the pipe by which the chamber B, and consequently the inlet-pipe A, are connected with the street-main. This pipe D we term, for convenience, the "water-supply" pipe. Extending through suitable stuffing-boxes in the side of the chamber B are the valve-stems $a$ $b$, respectively, of the valves A' B', the former arranged in due relation with the inner end of the waste-pipe C, and the latter in due relation with the inner end of the supply-pipe D.

E is a lever pivoted at $c$, with its one arm underneath the stop $a'$ of the valve-stem $a$ and the other underneath a like stop, $b'$, of the valve-stem $b$. Between the collars $a''$ and $b''$, secured upon the valve-stems $a$ and $b$ and the lever E, are spiral springs $c'$ and $d'$, these springs pressing upward against the under side of the lever E. The arm D'' of the latter is loaded—as, for example, by a weight, $e$. The said lever E presses down upon the upper end of the rod C' of a piston, D', which is placed in a cylinder, E', which may be provided with a suitable air-vent, 2, in its top, and is connected by means of a passage, $f$, in its bottom with a valve-chest, F, which in its turn connects by a pipe or passage, F', with the supply-pipe D. The valve, which is placed within the valve-chest F, is illustrated in detail in Figs. 8 to 11, inclusive. It is a plug-valve, of which the stem is shown at G' and the plug at G. This plug is provided with the four ways $c''$ of a four-way cock in the transverse line $x$ $x$ of Fig. 10, and with the four ways $d''$ of a four-way cock in the transverse line $y$ $y$ of Fig. 10, the valve or cock itself being therefore a double four-way cock, the ways of the one four-way cock being alternated with those of the other, so as to constitute what may be properly termed an "eight-way" cock.

From the valve-chest F extends a pipe, H, which connects with the waste-pipe C. The ways $c''$ and $d''$ of the double four-way cock are so arranged that the plug G, being intermittently rotated, is brought in certain positions to permit the passage of the water from the passage $f^2$ to the pipe H through the ways $c''$, and when in certain positions to permit the passage of water from the pipe F' to the pipe $f$ through the ways $d''$.

On the stem G' is a ratchet-wheel, $g$, which is further illustrated in Fig. 12. Pivoted upon the stem G' is a secondary lever, I, which is loaded—as, for example, by a weight, $g'$—and which is provided with a pawl, I', pivoted thereto, as shown at $h$, and the hook of which acts upon the ratchet-wheel $g$, the parts being so proportioned that when a certain movement is given to the lever I it will rotate the stem G', and consequently the double four-way cock, one-eighth of a revolution. The requisite movement of this lever I is afforded by means of an electro-magnet, K, its armature K', and catch K'', attached to said armature, a thermostat, M, electric circuit-wires and circuit-breaking devices. A portion of the latter comprises a circuit-breaker, M', composed of a series of radial arms, $i\ i^3$, attached to the valve-stem G'. When the armature K' is attracted to the electro-magnets K, the catch K'', pivoted, as shown, at $k^2$, is drawn back from under the lever I and permits the latter to descend, and thus turn the valve-plug G, as hereinbefore explained. When the magnet K is demagnetized, the armature K' is lifted by a spiral spring, L, interposed between a fixed support, $a^4$, and a projection, $b^4$, or equivalent device on the standard L'. The lever E is provided with a cross-bar, E'', to the opposite ends of which are provided the two rods R R', which are shown separately in Figs. 7 and 5, respectively. The rod R has near its lower end a pin or stud, $g^4$, which fits into a slotted guide, N, (shown separately in Fig. 4,) which is fixed in due relation to said rod. At its lower extremity the said rod R has a pivoted finger or pawl, $f'$, provided with a weight, $c^4$, to keep it in the normal position, and yet permit it to yield when operated, as hereinafter explained. The other rod, R', is provided with a pin or stud, $h^4$, which fits into a guide, N', which is shown separately in Fig. 6, and has at its lower end a finger or pawl, $f''$. The guide N is curved at its lower end, as shown at $e^3$ in Fig. 4, and the guide N' is curved at its upper end, as shown at $e'$ in Fig. 6. The transverse lever I is placed in such relation with the pawls $f'$ $f''$, respectively, that the pawl $f'$ of the rod R may bear from above against the short arm $i'$ of said lever, excepting when said pawl and the lower end of said rod R are drawn back by the curved lower portion, $e^3$, of the guide N, and the pawl $f''$ of the rod R' may bear from below under the long arm $i''$ of said lever I, excepting when said pawl and the lower end of said rod R' are drawn back by the curved upper portion, $e'$, of the guide N', so that the loaded long arm $i''$ of said lever I may be raised alternately by depression of the short arm $i'$, or elevation of the long arm $i''$, respectively, by said rods R and R' and their pawls $f'$ and $f''$, whenever the cross-bar E'' upon the lever E is either lowered or raised.

M is a thermostat of any suitable construction—as, for example, a thermostat composed, in the well-known manner, of two strips or pieces of metal having different capacities of expansion and contraction from the variations in temperature.

N is a battery, from which extends the wire N' to the electro-magnet K, and from thence through the wire $s^2$ to the contact piece or knob $m$. $n$ and $n'$ are two metallic spring-bars attached, as shown, at $r$. With one of these, $n'$, is connected the wire N'', the opposite end of which terminates with the contact-piece $r'$. From the other, $n$, of said spring-bars extends the wire $N^4$, which connects with another contact-piece, $r''$. Another circuit-wire, $s^4$, connects with the opposite end of the thermostat, and still another wire, $u$, extends from the said end of said thermostat to the battery. The radial arms $i\ i^3$ are made in two sets of four, the arms of the one set alternating with those of the other, and so arranged that the arms of the set $i$ will depress the spring-bar $n$, and those of the set $i^3$ will depress the spring-bar $n'$, as they are respectively brought in succession in contact with the said bars by the intermittent rotary movement of the stem G'. When the said bars are depressed, they are respectively brought out of contact with the contact-piece $m$, the said bars returning to their contact with said piece when released from the action of the said arms $i\ i^3$. When the apparatus is in the position shown in Fig. 1, the valve A' being open, the water is drained from the pipes in the dwelling or other building and escapes through the waste-pipe C to the sewer. When the parts are in this position, the water is cut off from the building. When water is required while the surrounding temperature is below the freezing-point, the switch S is turned until it occupies the position shown in dotted outline in Fig. 3. This breaks the electric circuit (indicated in Figs. 1, 2, and 3) and completes the circuit through the wire $s$.

The operation of the apparatus in this case is as follows: The current passes from the battery through the wire $s'$, switch S, and wire $s$ to the metallic spring-bar $n$, (said bar $n$ being in connection with the contact-piece $m$,) thence through the wire $s''$, magnet K, and wire N' to the battery. The magnet K being magnetized attracts the armature K', to which is attached the catch K'', down to its core, and the catch K'', swinging on its pivot $k^2$, is withdrawn from under the loaded arm of the lever I, allowing the latter to fall to the position shown in dotted outline in Fig. 3, which causes the plug of the double four-way cock to make one-eighth of a revolution, as hereinbefore explained. When the plug-valve is in this position, communication is established from the supply-pipe D through the pipe F' and ports or ways $d''$ of the plug of the cock, and through the passage $f$ into the cylinder E' below the piston D'. The pressure of water as it enters the cylinder below the piston D' forces the latter to the top of said cylinder. The upward movement of the piston-rod C' raises the long arm D'' of the lever E and lowers the short arm C''. During the upward movement of the arm D'' of said lever the spring $d'$ operates to keep the valve B' closed until the said lever comes in contact with the stop $b'$, when the further upward movement of the lever opens the valve B', thereby permitting the inflow of water from the supply-pipe D through the chamber B and pipe A to the system of pipes in the dwelling or other structure. Simultaneous with the upward movement of the arm D'' of the lever E the opposite arm, C'', of said lever moves downward upon the spring $c'$ and closes the valve A', depressing said valve by bearing against the washer $a''$ upon its stem $a$ through the spring $c'$. The downward or falling movement of the loaded arm of the lever I causes the stem $G'$, and consequently the circuit-breaker $M'$, provided thereon, to make one-eighth of a revolution, thereby bringing the radial arm $i$ in contact with the bar $n$, which latter being thus depressed the circuit is broken, the magnet K is demagnetized, and the armature $K'$ and catch $K''$ return by the action of the spring L to the position shown in Fig. 3. When the rod $R'$ is moved upward by the action of the lever E, its pawl $f''$, engaging the loaded arm $i''$ of the lever I, lifts the latter until it reaches the position shown in Fig. 3. By the further upward movement of the lever E the rod $R'$ is caused to follow the angular slot or curve $e'$ in the upper part of the guide $N'$, thereby drawing back the pawl $f''$ clear of the lever I, allowing said lever to rest on the catch $K''$. The said arm of said lever as it is being raised engages the catch and moves the latter back until said lever is raised clear of the catch $K''$, whereupon the catch returns to its former position by the action of the spring L, to support the loaded arm of said lever. As the arm $i''$ of the lever I is moved upward by the pawl $f''$ of the rod $R'$, the short arm $i'$ of said lever is moved downward, engaging the pawl $f'$ of the rod R. This pawl $f'$, being pivoted, as shown at $e''$ in the detail view of Fig. 7, swings downward and allows the arm $i'$ of the lever I to pass. The switch S being now turned back to its original position, (shown in Fig. 3,) the circuit is completed through the wire $s^3$, switch S, wire $s^4$, thermostat M, wire $N''$, bar $n'$, contact-piece $m$, wire $r^3$, magnet K, and wire $N'$ to the battery. The magnet K, being again magnetized, attracts the armature $K'$ down to its core, and the catch $K''$, relieving the loaded arm $i''$ of the lever I, allows the latter to fall and causes the plug of the double four-way cock to make one-eighth of a revolution by means of the pawl $I'$ and ratchet-wheel $g$, as hereinbefore explained. When the double four-way cock assumes this position, the water is shut off from the cylinder $E'$ and a passage effected between the cylinder $E'$ and the waste-pipe C through the pipe or passage $f^3$, ports or ways $c''$ of the plug of the cock and pipe H, thereby draining the water from the cylinder from under the piston $D'$, whereupon the loaded arm of the lever E, bearing upon the piston-rod $C'$, causes the piston $D'$ to descend, and the short arm $C''$ of said lever, bearing against the stop $a'$ of the valve-stem $a$, opens the valve $A'$, and the long arm $D''$ of said lever, bearing upon the spring $d'$ of valve-stem $b$, closes the valve $B'$, the further downward movement of the arm $D''$ being allowed by the compression of the spring $d'$. The arm $D''$ of the lever E in its descent moves down with it the rods R $R'$, and the pawl $f''$ of the rod R, engaging the short arm $i'$ of the lever I, pushes it down, thereby raising the loaded arm $i''$ of said lever until it rests on the catch $K''$, as hereinbefore explained. The pawl $f''$ disengages itself from the lever I by the rod R following the angular part or curve $e^3$ of the guide N, the said pawl being drawn back clear of said lever. On the downward movement of the rods R $R'$ the pawl $f''$ of the rod $R'$, being pivoted, as shown at $e^4$ in Fig. 5, as it encounters the loaded arm of the lever I swings upward, as shown in dotted outline in said Fig. 5, until it passes below said lever, when it drops to the position shown. When the double four-way cock has made the one-eighth of a revolution caused by the dropping of the lever I, as hereinbefore explained, the circuit-breaker $M'$ also makes one-eighth of a revolution, thereby bringing the radial arm $i^3$ in contact with the bar or strip $n'$, thereby breaking the circuit, as shown in Fig. 3. The drawings represent the parts in the position occupied by them when the temperature is at or below the freezing-point. When the temperature rises, the thermostat moves to the binding-screw or contact-piece $r''$, and coming in contact therewith completes the circuit through the battery, wire $u$, thermostat M, wire $N^4$, bar $n$, contact-piece $m$, wire $s''$, magnet K, and wire $N'$ to the battery, magnetizing the magnet, with the result hereinbefore described, remaining in such position until the temperature falls again.

Inasmuch as the apparatus as hereinbefore described is actuated from the electro-magnet and its armature, it is desirable that in the working of the parts no undue resistance should be offered to the power derived, as aforesaid, from the electro-magnet and its armature. Such resistance is liable to occur in some cases, by reason of the grinding of the plug G in its seat or the valve-chest, particularly when the plug is of the preferred conical shape. To avoid this objectionable tendency and to insure perfect ease of action, combined with the desired snugness of the valve-plug in its seat or valve-chest, we cause the end $a^5$ of the plug to project through a suitable bore in the end of its seat or valve-chest. We place upon the end $a^5$ of the plug, outside of such seat or valve-chest, a washer, $b^5$, held in place by a nut, $e^5$, screwed upon the said end $a^5$. There is provided to the adjacent end of the seat or valve-chest a yoke, $d^5$, in which is provided a suitable nut, through which is screwed a screw or bolt, $e^5$, the inner end of which bears against the end surface of the end $a^5$ of the valve-plug, and, being regulated by turning the screw or bolt $e^5$, affords an end bearing to the plug to retain the latter in the required position with reference to the inner walls of the seat or valve-chest, so that while the plug is held sufficiently close in its place for all required purposes it is prevented from being jammed into its seat or valve-chest to any extent which would interfere with or preclude its free turning within said seat or valve-chest.

What we claim as our invention is—

1. In an apparatus for voiding water-pipes, the combination of the double four-way cock with the valve-chest F, pipes or passages $f f^3$, cylinder E', piston D', pipes F' H C D A, chamber B, and valves A' and B', all substantially as and for the purpose herein set forth.

2. In an apparatus for voiding water-pipes, the combination of the double four-way cock with the valve-chest F, pipes or passages $f f^3$, cylinder E', piston D', pipes F' H C D A, chamber B, valves A' and B', ratchet-wheel $g$, lever I, and pawl I', all substantially as and for the purpose herein set forth.

3. In an apparatus for voiding water-pipes, the combination of the double four-way cock with the valve-chest F, pipes or passages $f f^3$, cylinder E', piston D', pipes F' H C D A, chamber B, and valves A' and B', provided with the valve-stems $a$ and $b$, all substantially as and for the purpose herein set forth.

4. In an apparatus for voiding water-pipes, the combination of the double four-way cock with the valve-chest F, pipes or passages $f f^3$, cylinder E', piston D', pipes F' H C D A, chamber B, valves A' and B', provided with the valve-stems $a$ and $b$, and springs $c'$ and $d'$, all substantially as and for the purpose herein set forth.

5. In an apparatus for voiding water-pipes, the combination of the double four-way cock with the valve-chest F, pipes or passages $f f^3$, cylinder E', piston D', pipes F' H C D A, chamber B, valves A' and B', ratchet-wheel $g$, lever I, pawl I', electro-magnet K, and armature K', all substantially as and for the purpose herein set forth.

6. In an apparatus for voiding water-pipes, the combination of the double four-way cock with the valve-chest F, pipes or passages $f f^3$, cylinder E', piston D', pipes F' H C D A, chamber B, valves A' and B', ratchet-wheel $g$, lever I, pawl I', electro-magnet K, armature K', catch K'', spring L, and standard L', all substantially as and for the purpose herein set forth.

7. In an apparatus for voiding water-pipes, the combination of the double four-way cock with the valve-chest F, pipes or passages $f f^3$, cylinder E', piston D', pipes F' H C D A, chamber B, valves A' and B', ratchet-wheel $g$, lever I, pawl I', electro-magnet K, armature K', thermostat M, battery N, and a system of electric wires for automatically magnetizing and demagnetizing the electro-magnet to give movement to the armature, all substantially as and for the purpose herein set forth.

8. In an apparatus for voiding water-pipes, the combination of the double four-way cock with the valve-chest F, pipes or passages $f f^3$, cylinder E', piston D', pipes F' H C D A, chamber B, valves A' and B', ratchet-wheel $g$, lever I, pawl I', electro-magnet K, armature K', catch K'', spring L, standard L', thermostat M, battery N, and a system of electric wires for automatically magnetizing and demagnetizing the electro-magnet to give movement to the armature, all substantially as and for the purpose herein set forth.

9. In an apparatus for voiding water-pipes, the combination of the double four-way plug G, having a projecting end, $a^5$, with the valve-chest F, having a yoke, $d^5$, a screw or bolt, $e^5$, pipes or passages $f f^3$, cylinder E', piston D', pipes F' H C D A, chamber B, and valves A' and B', all substantially as and for the purpose herein set forth.

JAMES W. KENT.
ROBERT ORR.

Witnesses:
JOHN WOOD,
ROBERT ORR, Jr.